(12) United States Patent
Smolka et al.

(10) Patent No.: US 11,994,669 B2
(45) Date of Patent: May 28, 2024

(54) LIQUID LENS WITH A LATERALLY ARRANGED PUMP PORTION

(71) Applicant: Optotune AG, Dietikon (CH)

(72) Inventors: Stephan Smolka, Zürich (CH); David Andreas Niederer, Küttigen (CH); Manuel Aschwanden, Allenwinden (CH); Johannes Haase, Dietikon (CH); Andreas Brändle, Dietikon (CH)

(73) Assignee: OPTOTUNE AG, Dietikon (CH)

( * ) Notice: Subject to any disclaimer, the term of this patent is extended or adjusted under 35 U.S.C. 154(b) by 298 days.

(21) Appl. No.: 17/123,176

(22) Filed: Dec. 16, 2020

(65) Prior Publication Data
US 2021/0181503 A1 Jun. 17, 2021

(30) Foreign Application Priority Data
Dec. 17, 2019 (EP) .................................... 19217016

(51) Int. Cl.
*G02B 27/00* (2006.01)
*G02B 3/14* (2006.01)
*G02B 26/00* (2006.01)

(52) U.S. Cl.
CPC ........... *G02B 27/0025* (2013.01); *G02B 3/14* (2013.01); *G02B 26/004* (2013.01)

(58) Field of Classification Search
CPC ..... G02B 27/0025; G02B 3/14; G02B 26/004
USPC ................ 359/237, 666, 599, 642, 665, 668
See application file for complete search history.

(56) References Cited

U.S. PATENT DOCUMENTS

| | | | | |
|---|---|---|---|---|
| 5,973,852 A | * | 10/1999 | Task | G02B 3/14 359/666 |
| 7,256,943 B1 | * | 8/2007 | Kobrin | G02B 3/14 359/666 |
| 2007/0201138 A1 | * | 8/2007 | Lo | G02C 7/085 359/666 |
| 2009/0195882 A1 | * | 8/2009 | Bolle | G02B 3/14 359/665 |
| 2010/0208357 A1 | * | 8/2010 | Batchko | G02B 5/20 359/666 |
| 2011/0267703 A1 | * | 11/2011 | Batchko | G02B 3/12 359/665 |

(Continued)

FOREIGN PATENT DOCUMENTS

WO      2019202166      10/2019

OTHER PUBLICATIONS

"Orientation independent coma compensating liquid lens" IP.COM Journal, IP.COM Inc., West Henrietta, Mar. 14, 2019 (53 Pages).

*Primary Examiner* — William R Alexander
*Assistant Examiner* — Sharrief I Broome
(74) *Attorney, Agent, or Firm* — JMB Davis Ben-David

(57) ABSTRACT

The invention relates to a lens having an adjustable optical power comprising a container with a frame structure delimiting a lens volume and a reservoir volume, wherein the lens volume and the reservoir volume are fluidically connected and comprise a liquid, wherein both volumes have at least one opening that are laterally shifted to each other and wherein each opening is covered by two elastically deformable membrane portions, wherein in the space enclosed between the membrane portions for each opening another liquid enclosed in. The invention further teaches a piston structure that is arranged to adjust a pressure in the reservoir volume such as to control a focal strength of the lens volume.

11 Claims, 12 Drawing Sheets

(56) References Cited

U.S. PATENT DOCUMENTS

2013/0176628 A1 7/2013 Batchko
2020/0400973 A1* 12/2020 Larmagnac ............ G02C 7/041
2021/0325575 A1* 10/2021 Niederer ................ G02B 3/14
2022/0057628 A1* 2/2022 Smolka .............. H02K 41/0356

* cited by examiner

LIQUID LENS WITH A LATERALLY ARRANGED PUMP PORTION

CROSS REFERENCE TO RELATED APPLICATIONS

Benefit is claimed to European Patent Application No. EP19217016.5 filed Dec. 17, 2019, the contents of which are incorporated by referenced herein in theft entirety.

FIELD

The invention relates to a lens with an adjustable focus.

BACKGROUND

Lenses having an adjustable focus are known in the art. Such lenses might comprise first elastically deformable membrane that can be adjusted with respect to its curvature such that the optical power of the lens changes. For this purpose, such liquid lenses comprise a liquid-filled container covered by the membrane with a pump device that is configured to adjust the pressure in the liquid. Upon changing the pressure of the liquid, the membrane adjusts its curvature accordingly so that a focus-adjustable lens is provided.

However, such membrane-based lenses have the inherent draw-back that depending on the orientation of the lens, particularly the membrane, the lens is prone to acceleration-induced aberrations, such as gravity coma, as the membrane "sacks" when not oriented perpendicular to gravity.

SUMMARY

The current invention aims to provide a coma-compensated lens with an adjustable optical power. The object is achieved by the lens having the features of claim 1. Advantageous embodiments are described in the dependent claims.

BRIEF DESCRIPTION OF THE FIGURES

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

DETAILED DESCRIPTION

Figure 1:
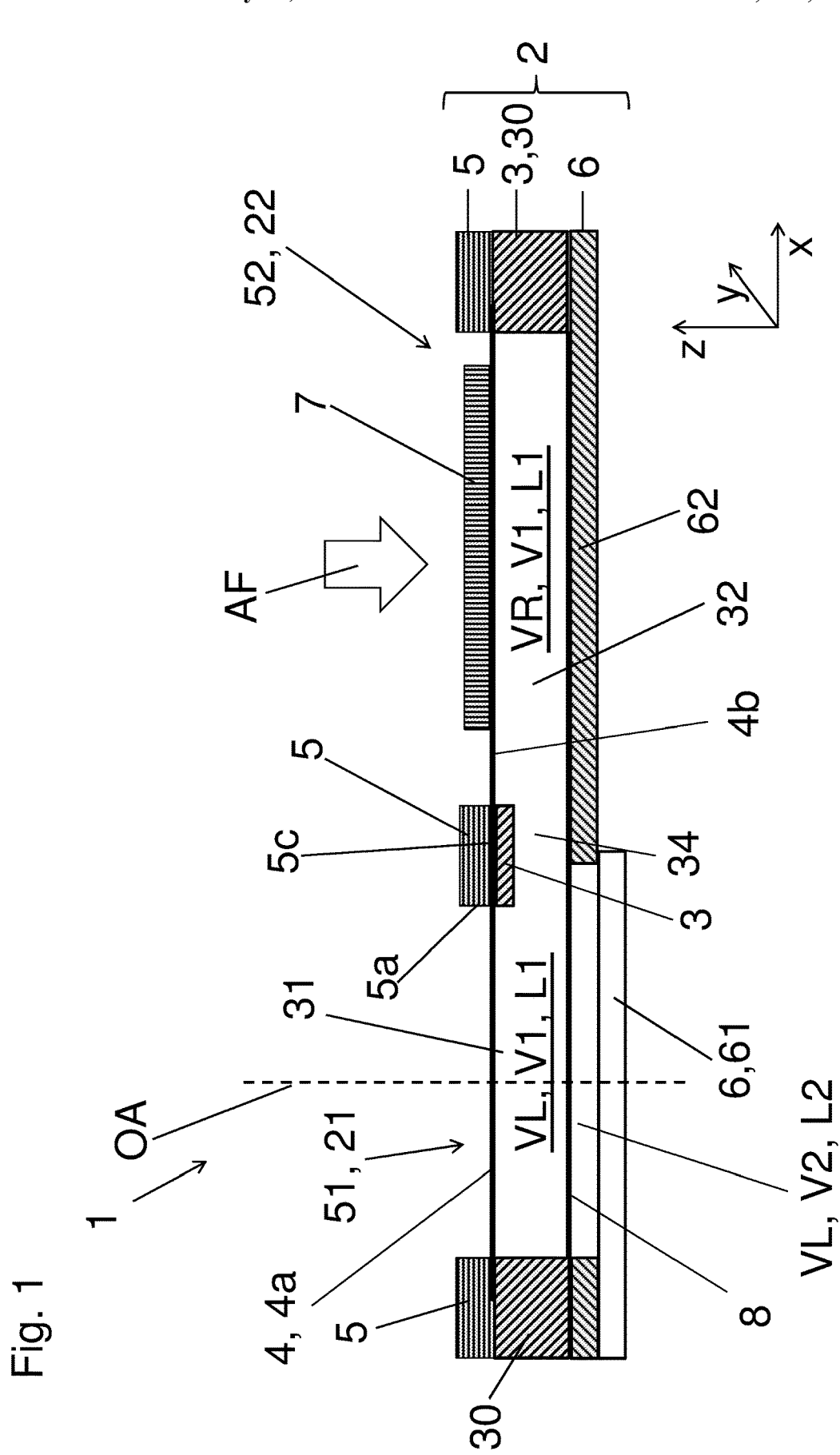
FIG. 1 shows a cross section of a first embodiment of the invention.

According to an exemplary embodiment of the invention, the lens has an adjustable optical power, wherein the lens comprises a particularly rigid container, wherein the container comprises at least the following components:

a frame structure forming a lateral wall of the container, wherein the frame structure comprises a lens volume and a reservoir volume that are fluidically connected, a bottom structure with at least a portion of the bottom structure that is transparent, wherein the bottom structure is connected to the frame structure, a first opening arranged opposite to the transparent portion of the bottom structure, wherein the lens volume extends between the first opening and the bottom portion opposite the first opening, a second opening covered by a membrane portion, wherein the reservoir volume extends at least partially between the second opening and the portion of the container, e.g. the bottom structure opposite the second opening, an elastically deformable transparent first membrane covering the first opening, a particularly elastically deformable transparent second membrane separating a first volume filled with a first liquid from a second volume filled with a second liquid, a lens shaping element arranged on the first opening and connected to the first membrane, wherein the lens shaping element comprises a circumferential aperture, also referred to as edge, defining a lens area of the first membrane having an adjustable curvature, particularly wherein the lens shaping element is integrally formed with the frame structure.

wherein the first volume and the second volume are arranged in the lens volume.

The lens with the feature according to the invention provides a structure for lens that is compensated for acceleration-induced aberrations, such as gravity coma.

The first volume or the second volume can be completely comprised by the lens volume, wherein the respective other volume of the first and the second volume also extends into the reservoir volume.

However, according to another embodiment, both, the first and the second volume extend into the reservoir volume.

The frame structure can be formed from a plurality of components that are merged, e.g. glued together to form the frame structure. It is particularly possible that the lateral wall comprises two or more components, particularly wherein said component are connected along a horizontal extension direction.

The term "horizontal" in the context of the current specification particularly refers to a plane that extends essentially parallel to the transparent portion of the bottom structure, more particularly to the transparent portion of the bottom structure that is comprised in the lens volume.

According to this notion, a z-axis of a Cartesian or cylindrical coordinate system is particularly defined by a direction that extends orthogonally to the transparent portion of the bottom structure, particularly to the transparent portion of the bottom structure that is comprised by the lens volume, i.e. particularly the transparent portion if the bottom structure that is arranged opposite the first opening of the lens. In analogy and known to the person skilled in the art, an optical axis of the lens can be defined.

The optical axis particularly extends through centre of the lens area of the first membrane parallel or on to the z-axis.

The first and the second membrane extend essentially orthogonally to the optical axis, when curvature is neglected.

Accordingly and without limitation, an x- and y-axis of a Cartesian coordinate system can be defined. The x-axis extends particularly between the centre of the lens area and a centre of the second opening orthogonal to the z-axis. Accordingly, the y-axis might extend orthogonally to the x and z axis.

According to one embodiment of the invention, the frame structure particularly comprises the first and the second volume. The frame structure, particularly the lateral wall of the container for example encloses the first and the second volume completely.

The frame structure particularly comprises a first recess and a second recess, wherein the lens volume is comprised by the first recess and the reservoir volume is comprised by the second recess.

The first and the second recess are particularly connected by a channel facilitating the fluidic connection between the lens and the reservoir volume.

The bottom structure can be directly connected to the frame structure or via an additional component.

According to one embodiment of the invention, the frame structure and the bottom structure, particularly only a portion of the bottom structure that is arranged at the reservoir volume, are integrally formed with each other.

The first opening of the container is associated to the lens volume and is a part of the optical lens.

In contrast the second opening is particularly not associated to the lens volume but the reservoir volume.

The second opening is particularly arranged outside an optical path of the lens, wherein the optical path extends through the lens and thus through the first opening, particularly through the lens area of the first opening.

The term "optical path" particularly refers to the portion of the lens that is configured to interact with the light for adjusting its wavefront.

The first opening is particularly part of the first recess.

The second opening is particularly arranged at the second recess comprising the reservoir volume.

The second opening can be on the same side or an opposite side of the first opening, i.e. in the bottom structure.

Moreover, the second opening can also be arranged in the lateral wall portion of the frame structure.

Moreover, according to another embodiment of the invention, the second opening is arranged laterally shifted particularly along the x-axis with respect to the first opening.

According to another embodiment of the invention, the first and the second opening extend parallel to a common plane, e.g. horizontally, particularly wherein the first and the second opening are arranged in the same plane.

According to the invention, the second opening is covered by the membrane portion. The term "covered" particularly refers to the membrane portion completely covering or closing the second opening.

According to another embodiment of the invention the frame structure, and/or the lens shaping element are connected to the first membrane by means of plasma-bonding or gluing.

According to another embodiment of the invention, the second membrane is connected to the frame structure, the bottom structure or any other component, such an intermediate layer structure of the lens by means of plasma bonding or gluing.

According to another embodiment of the invention the frame structure, the lens shaping element and/or any other component of the lens, such as a piston structure, are connected to the membrane portion by means of plasma-bonding or gluing.

According to another embodiment the membrane portion has a first side that faces an outside of the container and thus the reservoir volume, wherein the membrane portion has a second side opposite the first side, wherein said second side is in contact with a liquid in the container, particularly with the first or the second liquid.

The sides of the membrane portion are particularly surfaces of the membrane portion.

The first face is therefore particularly accessible to actuation devices and components that are configure to provide and generate and actuation force to the membrane portion for moving the membrane portion inward or outward the reservoir volume.

According to the invention the second opening is particularly sealed by the membrane portion, such that no liquid can exit or enter the lens.

Accordingly, the first membrane and/or the second membrane cover the first opening, particularly sealing the first opening, such that no liquid can exit or enter the lens.

The first, the second membrane and/or the membrane portion are particularly continuous components, particularly having no cut-outs or openings.

According to another embodiment the second membrane is arranged particularly completely in the lens volume.

According to an alternative embodiment, the second membrane particularly extends from the lens volume to the reservoir volume.

This embodiment particularly allows using the second membrane also as the membrane portion covering the second opening.

The term "an elastically deformable" particularly refers to a distensible membrane, while being capable of returning to an equilibrium state after a force has been applied to the membrane.

The term "transparent" particularly refers to the optical property of being transparent in an optical wavelength range. The wavelength range particularly extends from the ultra-violet to the infrared portion of the electromagnetic spectrum, particularly in a wavelength range between 200 nm to 2000 nm.

The first liquid has a first refractive index. Therefore, light can be refracted by the lens by adjusting the first membrane such that the membrane exhibits a curved surface. This process is also referred to adjusting the optical power of the lens.

According to another embodiment of the invention, the first and the second membrane as well as the first and the second liquid are selected such that an acceleration dependent aberration is compensated or prevented.

According to another embodiment of the invention, the second membrane comprises a first face that is contact with the first liquid and a second face that is in contact with the second liquid and that faces away, i.e. in an opposite direction from the first face.

According to another embodiment of the invention, the first liquid is in contact with a first face of the first membrane, wherein a second face of the first membrane that faces away, particularly in an opposite direction from the first face of the first membrane faces outward the container and is particularly exposed to the container surrounding medium such as air.

According to another embodiment of the invention, the first membrane is not in contact with the second liquid.

According to another embodiment of the invention, the first and the second membrane as well as the membrane portion are not formed by the first or the second liquid nor by an interface of the first and second liquid but consist of a different massive material.

According to another embodiment of the invention, the lens shaping element is integrally formed with the frame structure or another component of the container.

The lens area is particularly circular, but can be also formed differently depending on the exact shape of the lens shaping elements aperture.

The lens area particularly defines the region of the first membrane in which the curvature of the first membrane, also referred to as the curvature of the surface of the first membrane, particularly essentially along the optical axis is adjustable by adjusting a pressure on the liquid in the reservoir volume and thus in the lens volume.

This can be achieved by applying a deformation force to the membrane portion covering the second opening moving the membrane portion at least partially towards or away from the reservoir volume, such that the reservoir volume is increased or reduced. The increase or the decrease of the reservoir volume yields a deformation of the first membrane correspondingly decrease or increasing the lens volume.

Particularly, the second volume remains essentially constant in size, even when the reservoir volume and the lens volume are adjusted by an actuation of the membrane portion. However, the second volume might change shape upon actuation of the membrane portion or change of acceleration.

Particularly, the second membrane and the first membrane can change their curvature when the reservoir volume and the lens volume are adjusted by an actuation of the membrane portion.

According to the invention, the change of curvature of the first and the second membrane is such that any acceleration-induced aberration, such as gravity-induced coma is prevented or at least compensated.

Particularly, in an embodiment, the reservoir volume is arranged laterally shifted with respect to the z-axis with respect to the lens volume.

According to another embodiment of the invention, either the first volume or the second volume extends also into the reservoir volume, such that the reservoir volume comprises either the first or the second liquid.

This embodiment particularly allows for a simplified control mechanism for adjusting the optical power, i.e. the curvature of the first membrane, as either the first or the second liquid is used simultaneously for optical performance as well as for transmittal of actuation forces applied to the lens.

According to another embodiment of the invention, the second opening is located opposite the bottom structure or in the bottom structure.

This embodiment allows for arranged an actuation device on the side of the lens that faces away from the first opening. This embodiment can be useful when the lens is built in a device that has specific geometric constraints.

According to another embodiment of the invention, the membrane portion is comprised, particularly integrally comprised by the first membrane, wherein particularly only the first membrane covers, particularly seals the first and the second opening or wherein the membrane portion is comprised, particularly integrally comprised by the second membrane, wherein particularly only the second membrane covers, particularly seals the second opening.

According to another embodiment of the invention, the second opening is covered, particularly sealed by the membrane portion, wherein said membrane portion is comprised in a third membrane.

According to another embodiment of the invention, the first liquid has a first refractive index and the second liquid has a second refractive index, wherein the refractive indices of the first and the second liquid are different, particularly wherein the refractive indices are selected such that an acceleration-induced aberration, such as gravity-induced coma is compensated or prevented.

This embodiment allows for a posture independent used of the lens while the optical properties are largely maintained, as gravity-induced coma is compensated.

According to another embodiment of the invention, the first liquid has a first mass density and the second liquid has a second mass density, particularly wherein the refractive indices are selected such that an acceleration-induced aberration, such as gravity-induced coma is compensated or prevented.

According to another embodiment of the invention, the second mass density of the second liquid is smaller than the first mass density of the first liquid, and the second refractive index is larger than the first refractive index of the first liquid.

According to another embodiment of the invention, the first membrane has a first membrane stiffness $k_1$ and the second membrane has a second membrane stiffness $k_2$, particularly wherein a thickness of the first and the second membrane are essentially equal, wherein the first and the second stiffness are selected according to the relation $$\frac{k_1}{k_2} = \frac{n_2 - n_1}{n_2 - 1} \frac{\rho_1 - \rho_2}{\rho_2}$$

Wherein $\rho_1$ is the first mass density, $\rho_2$ is the second mass density, $n_1$ is the first refractive index and $n_2$ is the second refractive index.

According to another embodiment of the invention, the first membrane has a first thickness and the second membrane has second thickness, particularly wherein the stiffness of the first and the second membrane is essentially equal, wherein the first and the second thickness are selected according to the relation:

$$\frac{t_1}{t_2} = \frac{n_2 - 1}{n_2 - n_1} \frac{\rho_1 - \rho_2}{\rho_2}$$

According to another embodiment of the invention, the membrane stiffness of the first and/or the second membrane is in the range of 0.1 MPa and 10 MPa.

According to another embodiment of the invention, the membrane thickness of the first and/or the second membrane is in the range of 2 µm and 200 µm.

According to another embodiment of the invention, the first and/or the second refractive index is in the range of 1.26 and 1.6.

According to another embodiment of the invention, the first and/or the second mass density index is in the range of 1 kg*m$^{-3}$ and 1.8 kg*m$^{-3}$.

This embodiment allows for a posture compensation providing a lens which optical properties, particularly with respect to gravity induced aberrations remain almost unaltered independent of the orientation of the lens relative to gravity.

According to another embodiment of the invention, the second volume is enclosed between the second membrane and the transparent portion of the bottom structure, particularly wherein the second membrane is connected to the container between the bottom structure and the frame structure, particularly wherein the second membrane has curved surface and the second volume is formed only by the transparent bottom portion of the bottom structure and the second membrane.

According to this embodiment the second membrane is essentially arranged at the bottom structure.

For example it is possible to provide a recess in the bottom structure for enclosing the second volume or to enclose the second volume essentially "on top" of the transparent portion of the bottom structure opposite the first opening.

Particularly, when the second volume is comprised in the recess in the bottom structure it is possible to have the second membrane essentially planar, such that the second membrane generated essentially no optical power, except for compensation of aberrations.

Particularly when the second membrane is arranged on the transparent portion of the bottom structure opposite the first opening, i.e. when there is no recess for enclosing the second volume, the second membrane assumes a curved surface, and thus provides an additional optical power to the lens, which for some applications can be advantageous.

According to another embodiment of the invention, the bottom structure comprises a recess or a cut-out opposite the first opening, wherein the second volume and thus the second liquid is comprised in said recess or cut-out and enclosed therein by the second membrane and the transparent portion of the bottom structure that is particularly arranged at, i.e. below or outside said recess on an outside facing side of the container, particularly wherein the second membrane extends essentially planar over the second volume.

The recess can have a depth of 20 µm to 400 µm.

This embodiment allows for an essentially optically neutral second membrane with respect to optical power, while still allowing for aberration compensation. This embodiment also allows for negative optical powers of the lens.

According to another embodiment of the invention, the container comprises an intermediate layer structure arranged between the frame structure and the bottom structure, wherein the intermediate layer structure has a recess opposite the first opening, wherein the second volume and thus the second liquid is comprised in said recess and enclosed therein by the second membrane, particularly wherein the second membrane is connected to the container between the intermediate layer structure and the frame structure enclosing said recess, particularly wherein the second membrane extends essentially planar over the second volume.

The intermediate layer structure can have a thickness between 20 µm and 400 µm.

The intermediate structure particularly allows for connecting the frame structure with the bottom structure, particularly wherein the intermediate layer can be an additional fourth membrane that is for connecting the frame structure and the bottom structure.

According to another embodiment of the invention, the intermediate layer is made of a softer material than the frame structure and the bottom structure.

The material can for example be or comprise a Zeonor foil, a PET, PE, PU PVC, silicone or other polymers and plastics.

This allows for a better connection and levelling between the frame structure and the bottom structure.

According to another embodiment of the invention, the second membrane is arranged at or in the first opening of the container and connected to the frame structure and to the first membrane, such that a particularly an exclusively membrane-enclosed first volume is formed in the first opening.

This embodiment particularly forms a pillow-like structure in the first opening, having enclosed in the pillow-like structure the first liquid.

It is noted that in contrast to embodiments where the second membrane is arranged on the side of the bottom structure, e.g. covering a recess in or at the bottom structure, in embodiments where the second membrane is arranged at or in the first opening, the second membrane changes its curvature upon actuation of the lens, and thus contributes to the optical power change. This in turn might affect the choice of membrane stiffness and thickness for the first and the second membrane, which can positively affect the actuation and membrane properties.

According to another embodiment of the invention, the lens shaping element has an outer portion of the aperture, wherein said outer portion faces outwards of the lens volume and wherein the lens shaping element has an inner portion of the aperture that faces in the opposite direction than the outer portion, wherein the inner portion faces the frame structure, wherein the first membrane is connected to the container at the outer portion of the aperture and the second membrane is connected to the container between the inner portion of the aperture and the frame structure, such that the first volume is formed between the first and second membrane and the aperture of the lens shaping element.

The term "outwards of the lens" or "outwards the lens volume" and similar terms, particularly refers to a direction particularly a direction along the z-axis that points from the lens volume or the reservoir volume towards the surrounding of the lens.

An outside of the container particularly refers to the side that faces away from the reservoir and lens volume.

The inner portion is particularly a surface of the lens shaping element that corresponds to a surface of the frame structure for connecting the lens shaping element to the frame structure. Said surface has particularly a surface normal pointing along the z-axis.

Accordingly, the outer portion can have surface with a surface normal that also points along the z-axis, but in an opposite direction.

According to this embodiment the lens shaping element provides a lateral wall to the first volume, such that the first volume is enclosed by the first membrane on a side of the lens that faces the outside of the lens volume, by the second membrane on an opposite side than the first membrane and laterally by the lens shaping element.

According to an aspect of this embodiment, the second membrane can deform only within an area that corresponds to the lens area of the first membrane, if the lens shaping elements aperture has a constant shape along the optical axis.

Moreover, according to another aspect of this embodiment at least one of the first or the second membrane, particularly both membranes, extend particularly planar within the aperture of the lens shaping element, particularly when no actuation force is applied to the membrane portion.

It is noted that the membranes in no event are meant to be stiff when referred to the membrane extending essentially planar. Obviously, the membrane can change its curvature, however particularly in equilibrium state and when gravity acts perpendicular to the membrane surface, the membrane(s) can extend planar. When the lens is oriented in a different angle to gravity or the accelerating force, the first and the second membrane might exhibit a curvature, wherein the curvatures are such that aberrations are compensated.

According to another embodiment of the invention, the second membrane covers the first opening and the second opening, such that a third volume is formed at the second opening between the membrane portion covering the second opening and the second membrane, particularly wherein said third volume is filled the first liquid.

This embodiment allows adjusting the actuation forces by means of the stiffnesses of the first and the second membrane.

According to another embodiment of the invention, the lateral wall formed by the frame structure extends opposite the second opening into the reservoir volume such that the size of reservoir volume is reduced as compared to a lateral wall that has constant thickness along the z-axis.

This embodiment allows maintaining full actuation range of the membrane portion in the second opening along the z-direction, as the lateral wall protrudes at the side opposite the second opening into the reservoir volume.

Simultaneously, this embodiment allows for using less liquid in the lens, therefore providing a more economical solution with less thermal drift of the optical properties of the lens.

Particularly the lateral wall comprises a particularly conical protrusion extending inside the reservoir volume on the opposite side of the second opening, wherein the conus is largest at the bottom structure and smallest towards the second opening.

According to another embodiment of the invention, the membrane portion covering the second opening is configured to be deformed to pump the first or the second liquid from the reservoir volume into the lens volume to change a curvature of the lens area of the first membrane and therewith an optical power of the lens, and/or wherein the membrane portion is configured to be deformed to pump the first or the second liquid from the lens volume into the reservoir volume to change a curvature of the lens area of the first membrane and therewith an optical power of the lens.

This embodiment discloses in detail how an adjustment of the optical power is facilitated.

According to another embodiment of the invention, the lens comprises a piston structure arranged on a first side of the membrane portion covering the second opening, wherein the first side faces outward the reservoir volume and outward the container, wherein the piston structure is configured to receive an actuation force, particularly a mechanically transmitted actuation force, for pushing or pulling the piston structure towards or away from the second opening particularly along the z-axis such as to pump the first or the second liquid from the reservoir volume to the lens volume or vice versa, particularly by deforming the membrane portion.

The first side of the membrane portion is particularly a surface of the membrane portion that extends within the second opening.

The piston structure is particularly a rigid component connected to the membrane portion, particularly to the first side of the membrane portion.

The piston structure can also be made of a less rigid material such as a spring like rubber. Then an actuator stroke is elongated and a sensitivity of the actuator can be increased.

According to another embedment of the invention, the membrane portion has a surrounding portion that circumferentially surrounds the piston structure, particularly in a plane orthogonally to the z-axis, such that the piston structure is connected to the lens only by the connection with the membrane portion.

This allows for free actuation of the piston with respect to the lens.

According to another embodiment of the invention, the piston structure comprises an octagonal bottom surface connected to the membrane portion, particularly to the first side of the membrane portion.

According to another embodiment of the invention, the piston structure is formed by a plate comprising said bottom surface as well as an opposing octagonal top surface, wherein the top surface comprises a hole configured to receive an actuation portion of an actuator.

According to another embodiment of the invention, the piston structure is arranged centrally on the membrane portion, particularly such that hole configured to receive an actuation portion of an actuator is centred on the membrane portion.

According to another embodiment of the invention, the reservoir volume, particularly the second recess of the frame structure comprises an octagonal cross-sectional area.

The piston structure is particularly connected to the membrane portion by means of a plasma-bonding method or by glue.

According to another embodiment of the invention, the reservoir volume is arranged laterally next to the lens volume in a direction perpendicular to the optical axis of the lens.

According to another embodiment of the invention, the frame structure is formed by at least one monolithic plate member.

According to another embodiment of the invention, the frame structure is comprised of sheets stacked on top of one another.

According to another embodiment of the invention, the bottom structure is formed by a transparent, particularly rigid plate.

According to another embodiment of the invention, the bottom structure consists of a transparent, particularly rigid plate.

According to another embodiment of the invention, the bottom structure comprises a first portion and a second portion, wherein the first portion is integrally formed with or connected to the frame structure and the second portion is the transparent portion of opposite the first opening, wherein the second portion is a separate component that is connected to the first portion.

The second portion is for example a transparent cover plate.

The second portion is for example arranged in the same plane as the first portion of the bottom structure, such that at least on an inside of the container the bottom structure is devoid of recesses.

Alternatively, the second portion is for example arranged in a parallel plane as the first portion of the bottom structure, such that a recess is formed on an inside of the container. Said recess has been described above and particularly forms for the second volume.

According to another embodiment the first portion of the bottom structure is a further elastically deformable transparent membrane.

This embodiment allows for bi-convex and or bi-concave adjustable lenses.

According to another embodiment of the invention, the lens shaping element comprises a first through-opening forming the circumferential aperture, wherein the first through-opening is closed, particularly sealed by the lens area of the first membrane.

Further, according to an embodiment of the present invention, the lens shaping element comprises a second through-opening, wherein the second through-opening is covered, particularly sealed by the membrane portion.

Further, according to an embodiment of the present invention, the second through-opening of the lens shaping element comprises an octagonal shape.

According to another embodiment of the invention, for protecting the lens area of the first membrane, the lens shaping element is connected to the frame structure such that the first membrane is arranged between the frame structure and the lens shaping element, so that particularly the lens shaping element protrudes beyond said area of the membrane in the direction of the optical axis of the lens.

According to another embodiment of the invention, the container comprises a further reservoir volume connected (e.g. via a channel) to the lens volume of the container, wherein the container comprises a further membrane portion adjacent the further reservoir volume of the container covering, particularly sealing a further opening of the container, particularly wherein the further membrane portion is integrally formed with the first or the second membrane.

Particularly, in an embodiment, the reservoir volume and the further reservoir volume of the container face each other in a direction perpendicular to the optical axis of the lens and are arranged on opposite sides of the lens volume.

Further, according to an embodiment, the frame structure of the container comprises a third recess for accommodating at least a portion of the further reservoir volume of the container, which third recess is covered by the further member portion and particularly by the bottom structure of the container.

Further, according to an embodiment, the lens shaping element comprises a third through-opening, wherein the third through-opening is covered by the further membrane portion (e.g. by the first or second membrane).

Particularly, in an embodiment, the third through-opening comprises an octagonal shape or another shape that particularly corresponds to a shape of a cross section of the further reservoir volume.

Furthermore, according to an embodiment, the lens comprises a further piston structure connected particularly plasma-bonded or glued to said further membrane portion for deforming the further membrane portion by pushing against the further membrane portion or pulling on the further membrane portion.

Particularly, the further piston structure is configured to be connected to a further actuator for moving the further piston structure.

Particularly, according to an embodiment, the further piston structure comprises an octagonal bottom surface connected to the further membrane portion.

Furthermore, the further piston structure is formed by a plate comprising said bottom surface as well as an opposing octagonal top surface, wherein the top surface comprises a hole (e.g. a blind hole or a through-hole) configured to receive a portion of the a further actuator.

Furthermore, particularly, the further reservoir volume comprises an octagonal cross-sectional area parallel to said surface of the plate forming the further piston structure.

Furthermore, according to an embodiment of the present invention, the lens comprises a further actuator that is configured to act on the further piston structure to pump fluid from the further reservoir volume into the lens volume or from the lens volume into the further reservoir volume so as to change the curvature of the lens area of the membrane and therewith the optical power of the lens.

Particularly, the actuator and the further actuator can be one of the following actuators:

a voice coil or Lorentz force motor, a piezo drive, a screw drive, a thermoactive actuator, an SMA (shape memory alloy) actuator, a reluctance force actuator.

According to another embodiment of the invention, the transparent portion of the bottom structure consists of glass or a plastic and can be formed as a rigid lens According to another embodiment of the invention, the bottom structure is completely transparent.

In the following, additional optional aspects of the invention are provided that may form the basis for dependent as well as independent claims.

According to one embodiment, the lens having an adjustable optical power comprises a container. The container comprises the frame structure, wherein the frame structure delimits the lens volume and the reservoir volume at least partially in a lateral direction. The lens volume and the reservoir volume are fluidically connected to each other.

The first opening extends through the frame structure, wherein the lens volume is arranged at least partially in the first opening. The bottom structure and the elastically deformable transparent first membrane delimit the lens volume on opposite sides of the first opening.

A second opening extends through the frame structure, wherein the reservoir volume is arranged at least partially in the second opening. The further membrane portion delimits the reservoir volume on one side of the second opening.

The transparent second membrane separates the first volume filled with a first liquid from the second volume filled with a second liquid. The first volume and the second volume are arranged in the lens volume, and a spacer is arranged between the second membrane and the first membrane. Advantageously, the spacer enables a particularly precise alignment of the first and the second membrane, whereby a particularly high optical quality of the tunable lens is achieved.

According to one embodiment, the spacer has a ring shape and is directly connected to the first membrane and the second membrane. In particular, the first and the second membrane are connected to opposite sides of the spacer. For example, the first and the second membrane are bonded to the spacer. The spacer circumvents the lens area of the first membrane. In particular, the region of the first membrane, which is circumvented by the shaper is defined as the lens area. The lens area is arranged to provide an optical surface of the tunable lens. In particular, the lens is arranged to alter the curvature of the lens area in a predetermined manner.

According to one embodiment, the spacer comprises or consists of silicon. In particular, the spacer comprises or consists of mono-crystalline silicon. In particular, the total thickness variation is maximum 1 micrometer.

The thickness is the distance between opposing surfaces of the spacer along the optical axis of the lens. The total thickness variation is the difference between the maximum and minimum values of thickness.

According to one embodiment, the second opening does not have the shape of a prism. In particular, the second opening comprises a section, which may not be described by a prism. A prism is a geometric body created by parallel displacement of a plane polygon along a straight line in space that does not lie in this plane. In particular, the second opening is delimited on one side by the further membrane portion, wherein a cross-sectional area of the second opening decreases with increasing distance from the further membrane portion. Advantageously, this results in a particularly small reservoir volume, whereby thermal effects resulting from liquid expansion are reduced.

According to one embodiment either the first volume or the second volume extends also into the reservoir volume, such that the reservoir volume comprises the first liquid or the second liquid.

According to one embodiment, the membrane portion is comprised, particularly integrally comprised by the first membrane, wherein the first membrane covers the first and the second opening or wherein the membrane portion is comprised, particularly integrally comprised by the second membrane, wherein the second membrane covers the first and the second opening.

According to one embodiment, the first liquid has a first refractive index and a first mass density and the second liquid has a second refractive index and a second mass density, wherein the refractive indices and the mass densities are different respectively, and the refractive indices and the mass densities are selected such that an acceleration induced aberration of the lens, in particular gravity coma is compensated or prevented.

According to one embodiment, the container comprises the lens shaping element. The first opening extends though the lens shaping element and the lens shaping element circumvents the membrane portion and the second membrane. The lens shaping element comprises the outer portion facing away from the frame structure and the inner portion facing towards the frame structure, wherein the membrane portion is connected to the outer portion and the second membrane is connected to the inner portion.

According to one embodiment, the further membrane portion is configured to be deformed to pump the first liquid or the second liquid from the reservoir volume into the lens volume to change a curvature of the lens area of the first membrane and therewith an optical power of the lens, and/or the further membrane portion is configured to be deformed to pump the first liquid or the second liquid from the lens volume into the reservoir volume to change a curvature of the lens area of the first membrane and therewith an optical power of the lens.

According to one embodiment, the lens comprises a piston structure arranged on an outward facing side of the further membrane portion covering the second opening, wherein the piston structure is configured to receive an actuation force, particularly a mechanically transmitted actuation force, for pushing or pulling the piston structure towards or away from the second opening such as to pump the first or the second liquid from the reservoir volume to the lens volume or vice versa.

Figure 2:
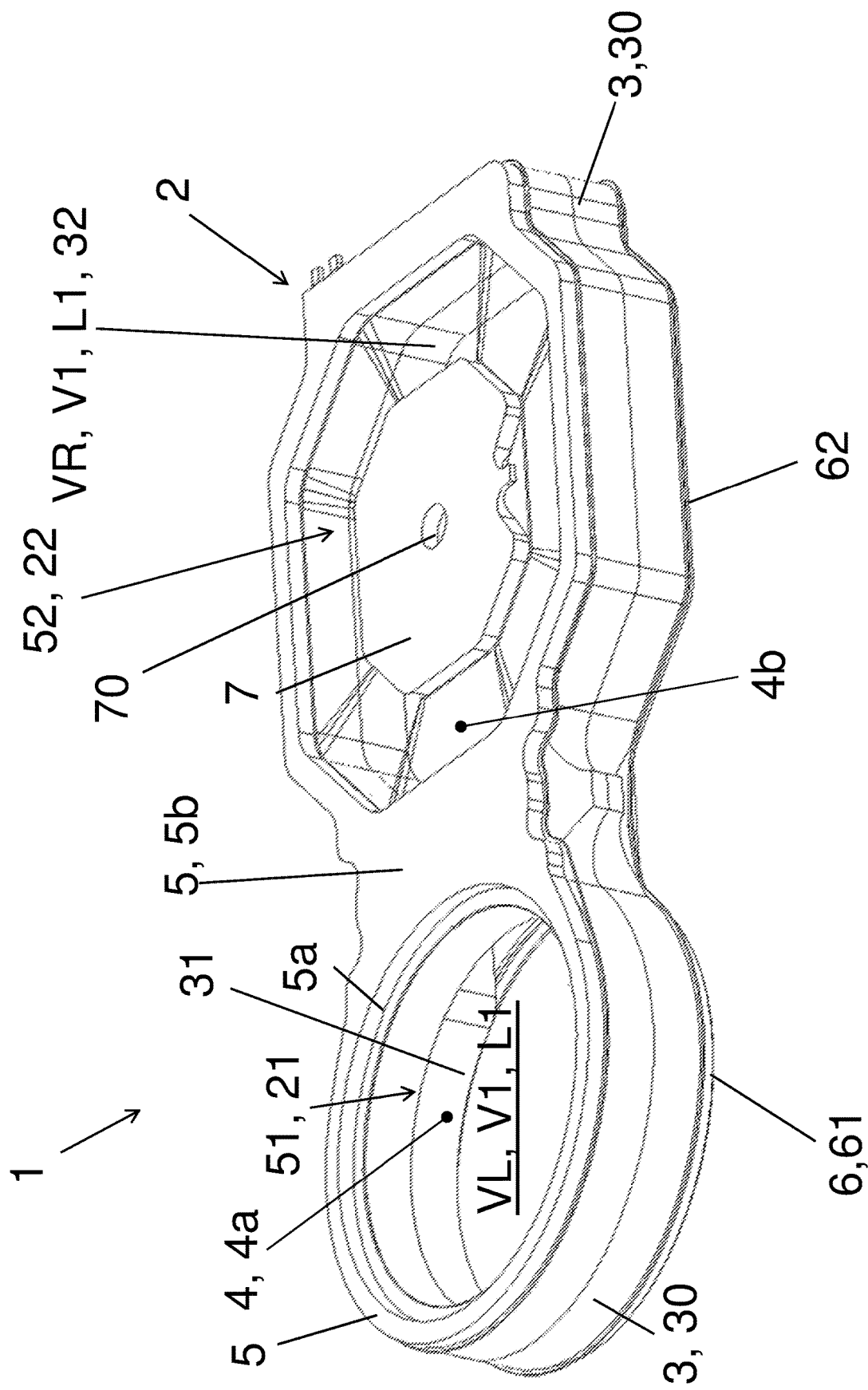
FIG. 2 shows a three-dimensional view of the first embodiment of the invention.

FIG. 1 and FIG. 2 show different views of an embodiment of a lens 1 according to the present invention. Particularly, the lens 1 comprises a preferably flat and elongated (e.g. cuboid) container 2. The container 2 comprises a lens volume VL and a reservoir volume VR connected to the lens volume VL e.g. via a channel 34, a frame structure 3 forming a lateral wall 30 of the container 2, wherein the frame structure 3 comprises a first recess 31 in the form of a first through-opening for accommodating at least a portion of the lens volume VL, and wherein the frame structure 3 comprises a second recess 32 for accommodating at least a portion of the reservoir volume VR. Particularly, as shown in FIG. 1 and FIG. 2, the frame structure 3 is formed as a monolithic plate member e.g. in form of an injection molded part, but may also be formed out of several parts e.g. a stack of e.g. metallic sheets and or silicon sheets. The sheets might be glued on top of each other, wherein the glue can account for thickness variations such that the container height is kept constant even if the sheets have varying thickness.

Furthermore, the container 2 comprises an elastically deformable and transparent first membrane 4 connected to the frame structure 3, a lens shaping element 5 connected to the first membrane 4, wherein the lens shaping element 5 comprises a circumferential preferably circular edge or aperture 50a defining a lens area 4a of the first membrane 4 having an adjustable curvature, an at least partially transparent bottom structure 6 connected to the frame structure 3 so that the lens volume V is arranged between said area 4a of the membrane 4 and a transparent portion 61 of the bottom structure 6, and a particularly elastically deformable membrane portion 4b adjacent the reservoir volume VR.

The container 2 has a first opening 21 that is covered and sealed by the first membrane 4 and a second opening 22 that is covered by the membrane portion 4b.

In this example the membrane portion 4b is integrally formed with the first membrane 4.

Particularly, the lens 1 comprises a second transparent and elastically deformable membrane 8 connected to the frame structure 3 on an opposite side with respect to the first membrane 4, wherein the second membrane 8 is also connected to a particularly non-transparent portion 62 of the bottom structure 6 that is arranged opposite the second opening 22.

Furthermore, the bottom structure 6 comprises a transparent rigid plate 61 arranged opposite the first opening 21, so that a recess V2 is formed in the bottom structure 6. Said recess V2 is laterally enclosed by the non-transparent bottom structure 62. The second membrane 8 in turn seals said recess V2 on an inside of the container 2 and the lens volume VL.

In this example, the reservoir volume VR and parts of the lens volume VL are filled by a first liquid L1. The portion filled with the first liquid L1 is referred to as the first volume V1 of the container 2. The recess V2 is filled with a second liquid L2, wherein the recess V2 filled with the second liquid L2 is referred to as the second volume V2. It is noted that the portion filed with the second liquid is referred to as the second volume V2 and the volume filled with the first liquid is referred to as the first volume V1 for all embodiments of the invention.

The second volume V2 and thus the second liquid L2 is separated from the first volume V1 (and thus also the first liquid L1) by the second membrane 8.

The second volume V2 is comprised in its entirety in the lens volume VL, wherein the first volume V1 also extends into the reservoir volume VR.

The recess V2 might have a circular shape in the plane orthogonally to the optical axis OA of the lens 1.

The optical axis OA of the lens 1 extends through the centre of the aperture 5a of the lens shaping element 5 and the recess V2.

Advantageously, the membranes 4, 8 form interfaces between the respective components and act as a mechanical buffer, respectively.

Furthermore, different thermal expansion coefficients of materials on both sides of the respective membrane 4, 8 are buffered during temperature changes by the flexible membrane layers 4, 8. Furthermore, the respective membrane 4, 8 helps to absorb shocks (e.g. in case of dropping of the lens). Finally, the respective membrane 4, 8 may help to achieve a well-defined distance between the individual components.

Particularly, as shown e.g. in FIG. 2 the lens shaping element 5 is formed as a flat plate and comprises a first (e.g. circular) through-opening 51 forming said circumferential aperture 50a, wherein the first through-opening 51 is closed by said area 4a of the first membrane 4.

According to a preferred embodiment, the first membrane 4 is arranged between the frame structure 3 and the lens shaping element 5. This allows protecting the first membrane 4 which will be described further below.

The lens 1 may further comprise the following components. A piston structure 7, wherein the piston structure 7 in this example is formed as an octagonal rigid non-transparent plate that is arranged in the centre of the membrane portion 4b (cf. FIG. 2) and is laterally surrounded by the membrane portion 4b such that the piston structure 7 is connected to the lens 1 only by means of the connection between the piston structure 7 and the membrane portion 4b.

The connection can be established by gluing or by plasma-bonding.

The piston structure 7 is arranged on an outside facing side of the membrane portion 4b such that actuation is possible by a mechanical actuation force AF that is applied to the piston structure 7. For this purpose, the piston structure 7 has a recess or a hole 70 (cf. FIG. 2) for receiving an actuating component of an actuator (not shown).

Particularly, the piston structure 7 may be formed out of a metal (magnetic or non-magnetic) or a plastic material such as a polymer, a spring or a damping material such as rubber. Further, the lens shaping element 5 may be formed out of a metal (magnetic or non-magnetic), a plastic material (e.g. polymer) or silicon. Furthermore, the frame structure 3 can be formed out of a metal or a plastic material (e.g. polymer), or silicon, too.

The bottom structure 6 (e.g. the transparent plate 61) may comprise an anti-reflection coating on at least one side (e.g. on an outside and/or on an inside of the container 2) and/or may also comprise a lens shape (i.e. is not flat but comprises convex or concave surface).

The lens 1 according to this embodiment is configured to compensate acceleration induced aberrations, particularly gravity induced coma.

For this purpose the refractive indices of the first and the second liquid L1, L2 as well as the mass densities of the first and the second liquid L1, L2 as well as the membrane stiffnesses and thicknesses have to be selected accordingly.

Such a lens 1 exhibits posture independent optical properties, as the optical performance remains unchanged independent of when for example the optical axis OA (and the whole lens) of the lens 1 is pointing along the gravitational pull or push (or the acceleration force) or when the optical axis OA encloses a different angle, such as a right angle, with said force.

Thus, the first liquid L1 has a first refractive index $n_1$ and a first mass density $\rho_1$ and the second liquid L2 has second refractive index $n_2$ and a second mass density $\rho_2$. Depending on the design parameters of the first and the second membrane 4, 8, the refractive indices $n_1$, $n_2$ and the mass densities can be selected in order to achieve the compensation for acceleration-induced aberrations.

The design parameters for the first and the second membrane are the thickness $t_1$, $t_2$ and the membrane stiffness $k_1$ and $k_2$.

For example, assuming the same thickness for the first and the second membrane 4, 8, the stiffness $k_1$, $k_2$ of the membranes 4, 8 is related to the refractive indices and mass densities according to $$\frac{k_1}{k_2} = \frac{n_2 - n_1}{n_2 - 1} \frac{\rho_1 - \rho_2}{\rho_2}$$

Wherein $k_1$ is the stiffness of the first membrane 4, $k_2$ is the stiffness of the second membrane 8, $\rho_1$ is the first mass density of the first membrane 4, $\rho_2$ is the second mass density of the second membrane 8, $n_1$ is the first refractive index of the first membrane 4 and $n_2$ is the second refractive index of the second membrane 8.

Alternatively if the membranes 4, 8 exhibit the same stiffness $k_1$, $k_2$ the thicknesses $t_1$ of the first membrane 4 and the thickness $t_2$ of the second membrane 8 can be chosen according to $$\frac{t_1}{t_2} = \frac{n_2 - 1}{n_2 - n_1} \frac{\rho_1 - \rho_2}{\rho_2}$$

Particularly, the first liquid L1 and the second liquid L2 comprise a refractive index $n_1$, $n_2$ in the range from 1.2 to 1.4, and/or wherein the transparent and elastically deformable first and second membrane 4 or 8 comprises a refractive index in the range from 1.3 to 1.6, and/or wherein the transparent rigid plate 61 (of the bottom structure 6) comprises a refractive index in the range from 1.4 to 1.6.

More applicable values for the mass densities of the liquids, the thickness and stiffness of the membranes can be found in the previous description.

When the piston structure 7 is pushed towards the reservoir volume VR particularly along the z-axis (indicated by the coordinate system with arrows along x, y, z, or pulled away from the reservoir volume VR, particularly along the z-axis, the first liquid L1 (or the second liquid L2 in other embodiments) in the reservoir volume VR is forced in or out the lens volume VL, such that the first membrane 4, more particularly the lens area 4a of the first membrane 4 will deform and adjust its curvature (particularly along the z-axis), such that the optical power of the lens 1 changes.

In contrast, the second membrane 8 will hardly change its shape, as the second liquid L2 (as well as the first liquid) is essentially incompressible. Therefore, the size of the second volume V2 remains constant upon actuation. The first volume V1, the reservoir volume VR and the lens volume VL however will change shape and/or size.

In the following, features, components and reference signs that have been introduced in this section will not be referred to again in the following descriptions of the figures but do apply the same if not stated otherwise in order to reduce an excess of redundancy in the description.

It is noted that in FIG. 2 the piston structure 7 is pushed slightly inward the container 2, such that the membrane portion 4b bends towards the inside of the reservoir volume VR and the lens area 4a is pushed outward forming a curved lens.

Figure 3:
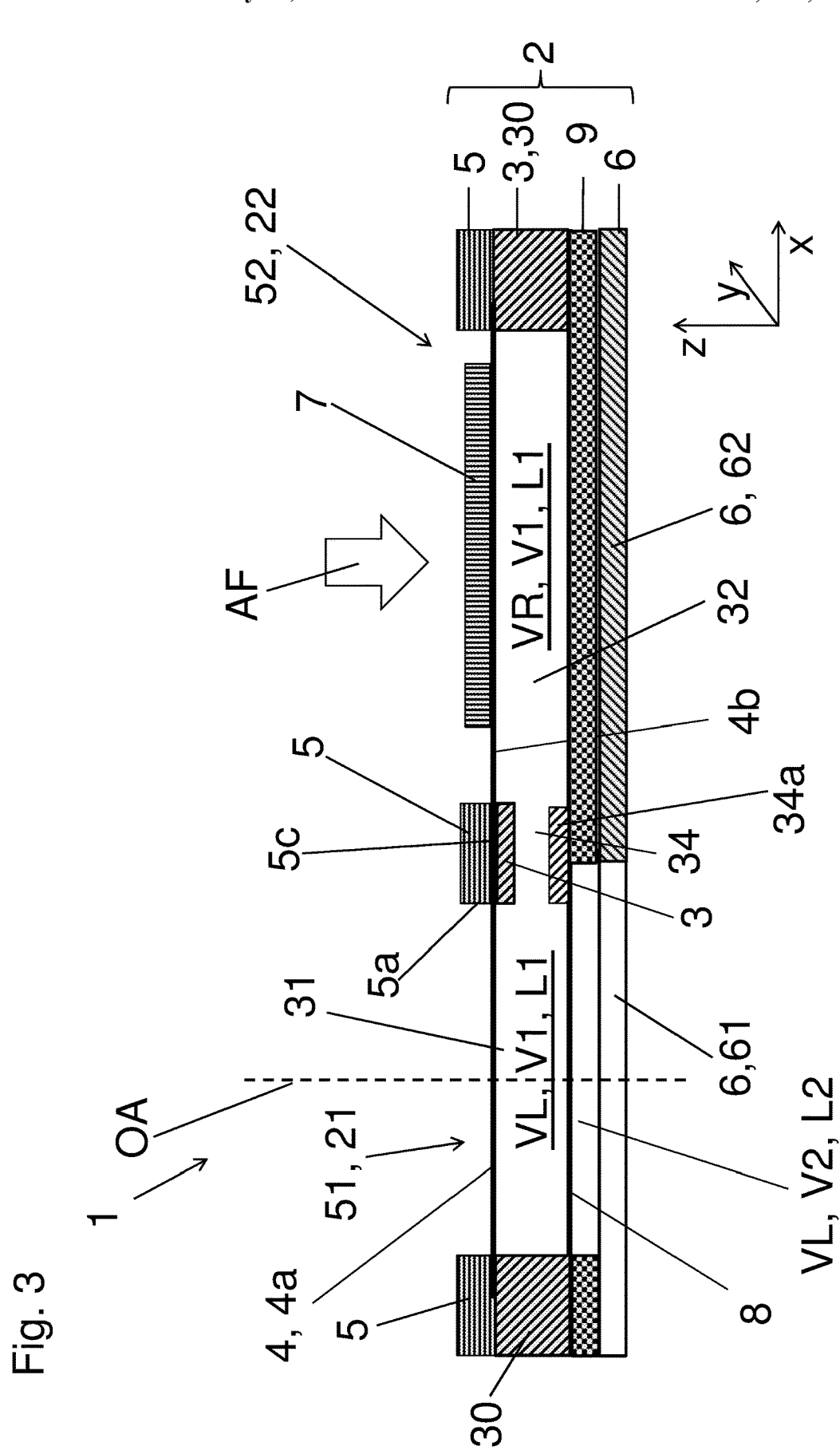
FIG. 3 shows a cross section of a second embodiment of the invention with an intermediate layer structure.

In FIG. 3 a variation of the embodiment shown in FIGS. 1 and 2 is shown. In contrast to the embodiment in FIGS. 1 and 2, the container 2 further comprises an intermediate layer structure 9 arranged between the frame structure 3 and the bottom structure 6. The bottom structure 6 is formed in two separate parts, the transparent cover 61 and the non-transparent portion 62 opposite the second opening 22 that are arranged next to each other in the same plane and forming a planar surface on the outside and the inside of the container 2. The intermediate layer structure 9 in turn has a cut-out or recess V2 opposite the first opening 21, wherein said recess V2 forms the second volume V2 with the second liquid L2. The recess V2 is covered and sealed by the second membrane 8. Thus, the second volume V2 is laterally enclosed by the intermediate layer structure 9, wherein the transparent portion 61 of the bottom structure 6 closes the second volume V2 towards an outside of the container 2.

The intermediate layer structure 9 is formed from a soft material such that a connection between the frame structure 3 and the bottom structure 6 is facilitated less complex as both, the frame structure 3 and the bottom structure 6, when formed from a hard material, have to be connected liquid tight, which is facilitated more easily by the intermediate layer structure 9.

The intermediate layer 9 can also consist of a membrane.

Figure 4:
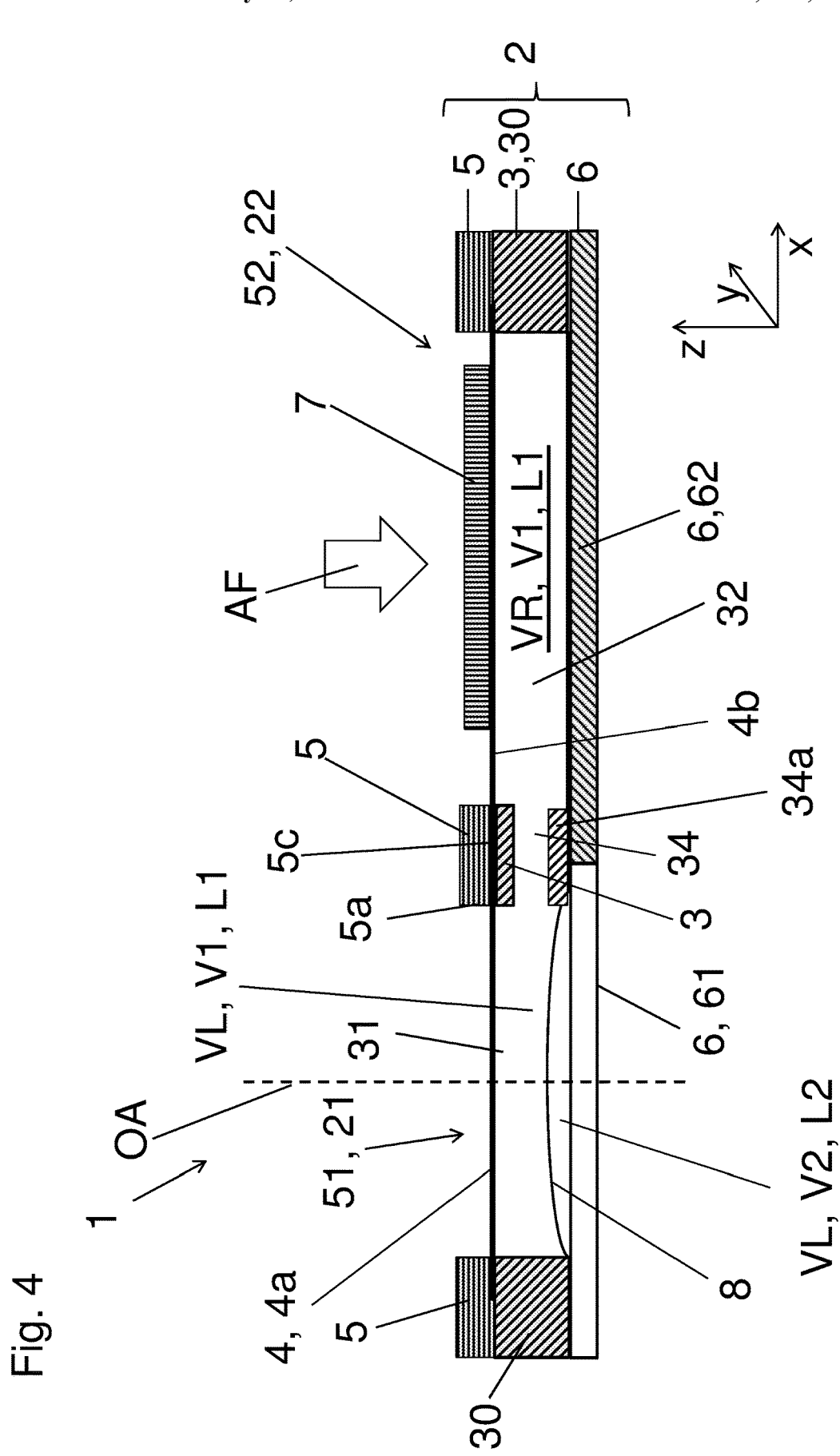
FIG. 4 shows a cross section of a third embodiment of the invention with a curved second membrane on the bottom structure.

Also, as an optional feature applicable to all embodiments of the lens 1 and not only to the embodiments shown in FIGS. 3 and 4, an additional channel tuning element 34a is provided that can be integrally formed with the frame structure 3, the bottom structure 6 or it might be separately attached to the container 2. The channel tuning element 34a extends into the channel 34 such that a channel diameter is reduced. On the one hand this allows for less liquid in the container 2, and on the other hand mechanical stability of the container 2 might be increased.

In this embodiment and the embodiment of FIG. 4, the second membrane 8 is additionally connected to the channel tuning element 34a, wherein the channel tuning element 34a is integrally formed with the frame structure 3.

In FIG. 4 an alternative embodiment is shown. In contrast to the previous embodiments, the second volume V2 is not comprised in a recess formed in the bottom structure 6 or the intermediate layer 9. Instead the second membrane 8 seals the second volume V2 directly with the transparent bottom portion 61 of the bottom structure 6 without any lateral limits imposed from a third component such as the intermediate layer structure 9 (FIG. 3) or the non-transparent portion 62 (FIG. 1 and FIG. 2) of the bottom structure 6.

The second membrane 8 is connected to the container 2 between the lateral wall 30 of the frame structure 3 and the bottom structure 6.

The second membrane 8 in this embodiment assumes a curved surface along the z-axis imposing an optical power to the lens 1 that depends on the refractive indices of the first and the second liquid L1, L2. Upon actuation the curvature of the second membrane 8 does not change. The curvature of the second membrane 8 (and also the first membrane 4, 4a) however might change in response to a change in acceleration force with regard to direction or strength, thus compensating any acceleration-induced aberration by the first membrane 4, 4a.

The bottom structure 6 in this example is formed similar to the embodiment of FIG. 3, namely planar.

Figure 5:
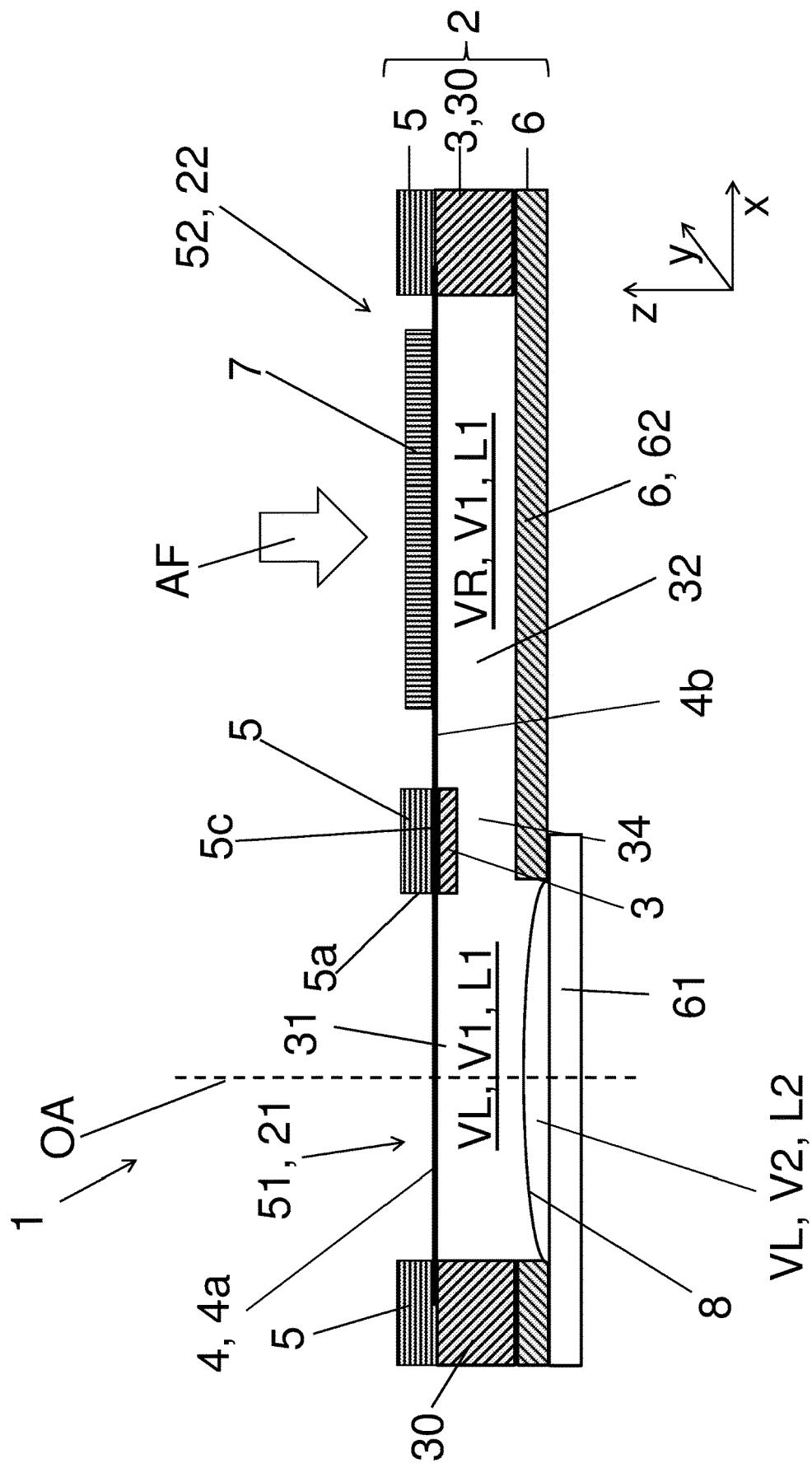
FIG. 5 shows a cross section of a fourth embodiment of the invention with a curved second membrane in a recess of the bottom structure.

In FIG. 5 an embodiment is shown with the bottom structure 6 having a similar structure as the bottom structure in FIG. 1 with a recess V2 formed by the bottom structure 6 by means of a transparent cover plate 61 forming the transparent portion of the bottom structure 6 opposite the first opening 21.

In the recess V2 the second membrane 8 is arranged sealing the second liquid L2 into the second volume V2. In contrast to the embodiment of FIG. 1, the second volume V2 is formed only by the second membrane 8 and the transparent portion 61 of the bottom structure 6, i.e. without a lateral wall provided by the particularly non-transparent portion 62 of the bottom structure 6.

Therefore, the second membrane 8 forms a curved surface. Moreover, the second membrane 8 is connected to the container 2 between the transparent cover plate 61 and the frame structure 3, 30 as well as between the non-transparent portion 61 of the bottom structure 6.

This embodiment allows for an optical power provided by the second membrane 8 and a different assembly process of the lens 1 with regard to the bottom structure 6.

Figure 6:
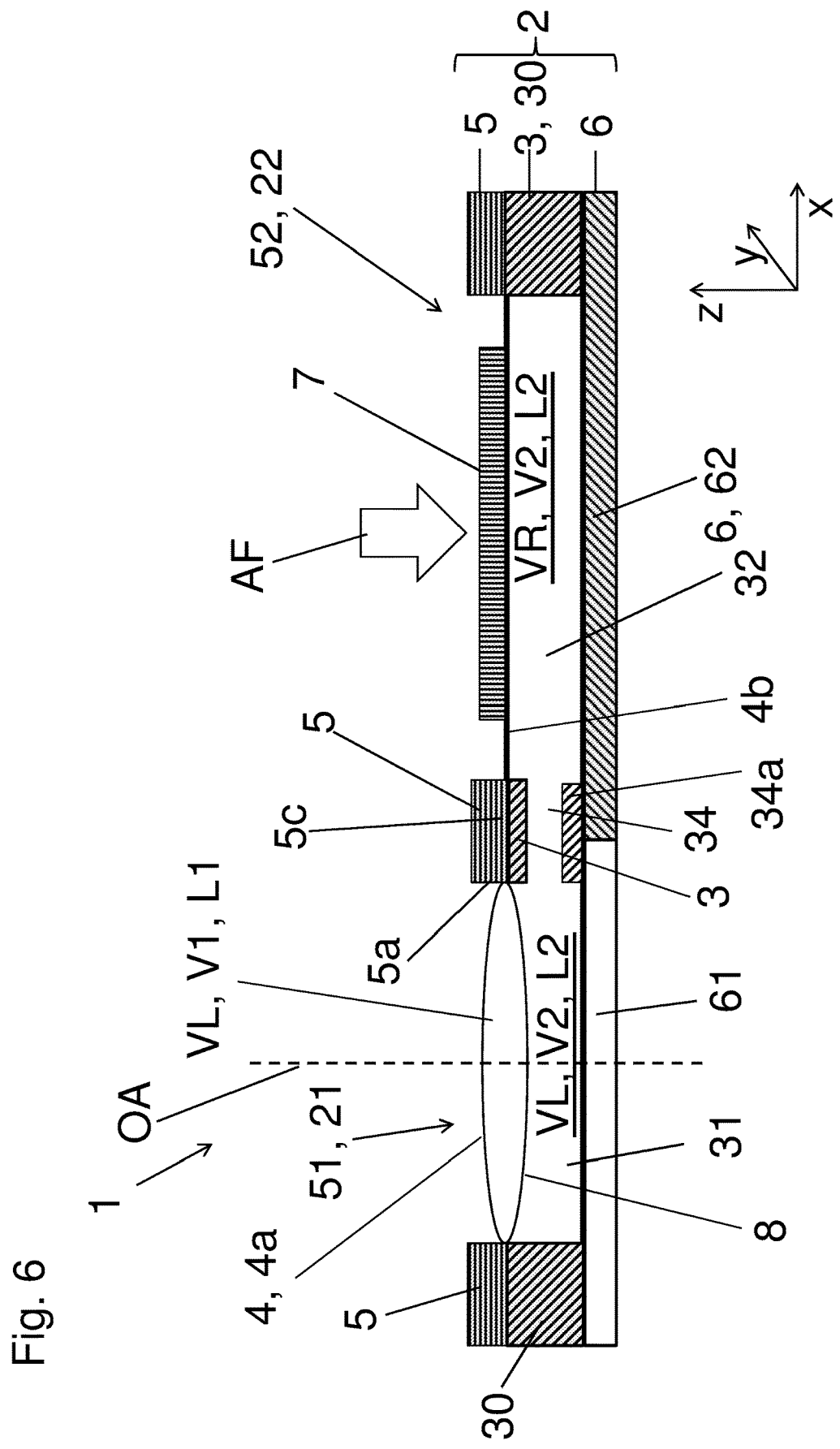
FIG. 6 shows a cross section of a fifth embodiment of the invention with a pillow-like first volume.
Figure 7:
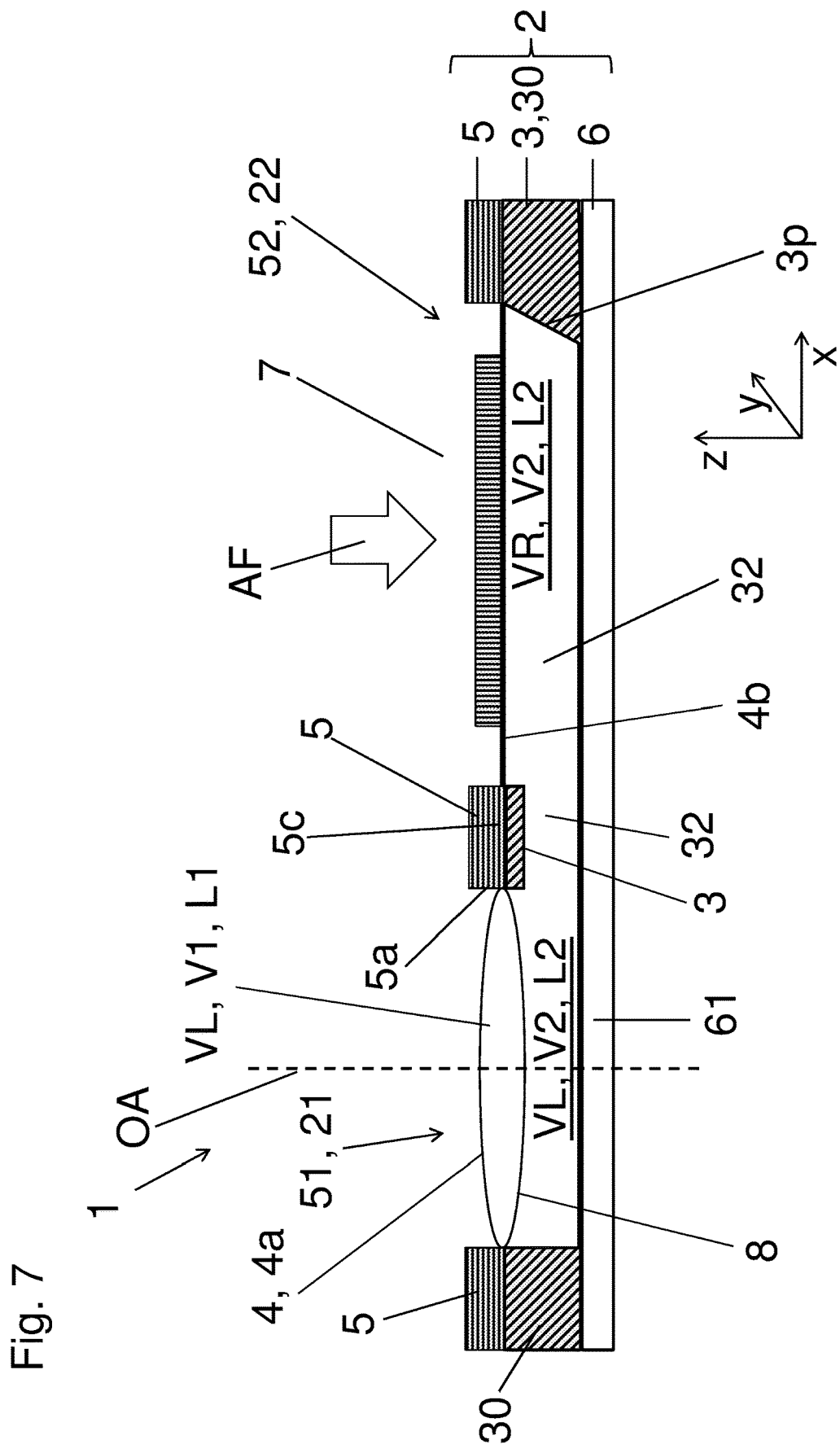
FIG. 7 shows a cross section of a sixth embodiment of the invention with a pillow-like first volume and a protrusion in the later wall structure.

In FIG. 6 and FIG. 7, the second membrane 8 is arranged such in the lens 1 that it forms a pillow-like structure V1 together with the first membrane 4, more particularly with the lens area 4a of the first membrane 4. For this purpose the second membrane 8 is connected to the frame structure 3 in the first opening 21 and thus seals the first opening 21 such that the second liquid L2 which fills the lens volume VL partially and the reservoir volume VR completely cannot permeate through the opening 21 or into the first volume V1 which is comprised in the volume formed between the second membrane 8 and the lens area 4a that is connected to the second membrane 8 at the aperture 5a of the lens shaping element 5. The first membrane therefore seals the first liquid in the first volume V1. The first volume forms the remaining portion of the lens volume VL. Both membranes 4, 8 are circumferentially connected between the frame structure 3 and the lens shaping element 5 at its aperture 5a.

In contrast to the previous examples, the second volume V2 is the volume that extends into the reservoir volume VR and not the first volume V1, which is completely comprised in the first opening 21 and thus in the lens volume VL.

The achievable effect is the same as with the previous embodiments, namely a compensation of acceleration-induced aberrations.

According to the example shown in FIGS. 6 and 7, the first membrane 4 and the second membrane 8 assume a curved surface even in an equilibrium state, i.e. a state where no actuation forces AF are applied to the piston structure 7. Such a lens 1 therefore provides an optical power even in its equilibrium state.

The difference in the embodiments shown in FIG. 6 and FIG. 7 is solely in the arrangement of the bottom structure 6. In FIG. 6 the bottom structure 6 is planar as is FIG. 3 and consist of two separate portions, a first transparent portion 61 at the lens volume VL and a second non-transparent portion 62 opposite the second opening 22.

In FIG. 7 the complete bottom structure 6 is formed by a transparent cover plate 61. Moreover, by way of example, which can be applied to all other embodiment as well, it is shown that the lateral wall 30 of the frame structure 3 comprises conical protrusion 3p at the second opening 22, such that the reservoir volume VR is reduced.

Figure 8:
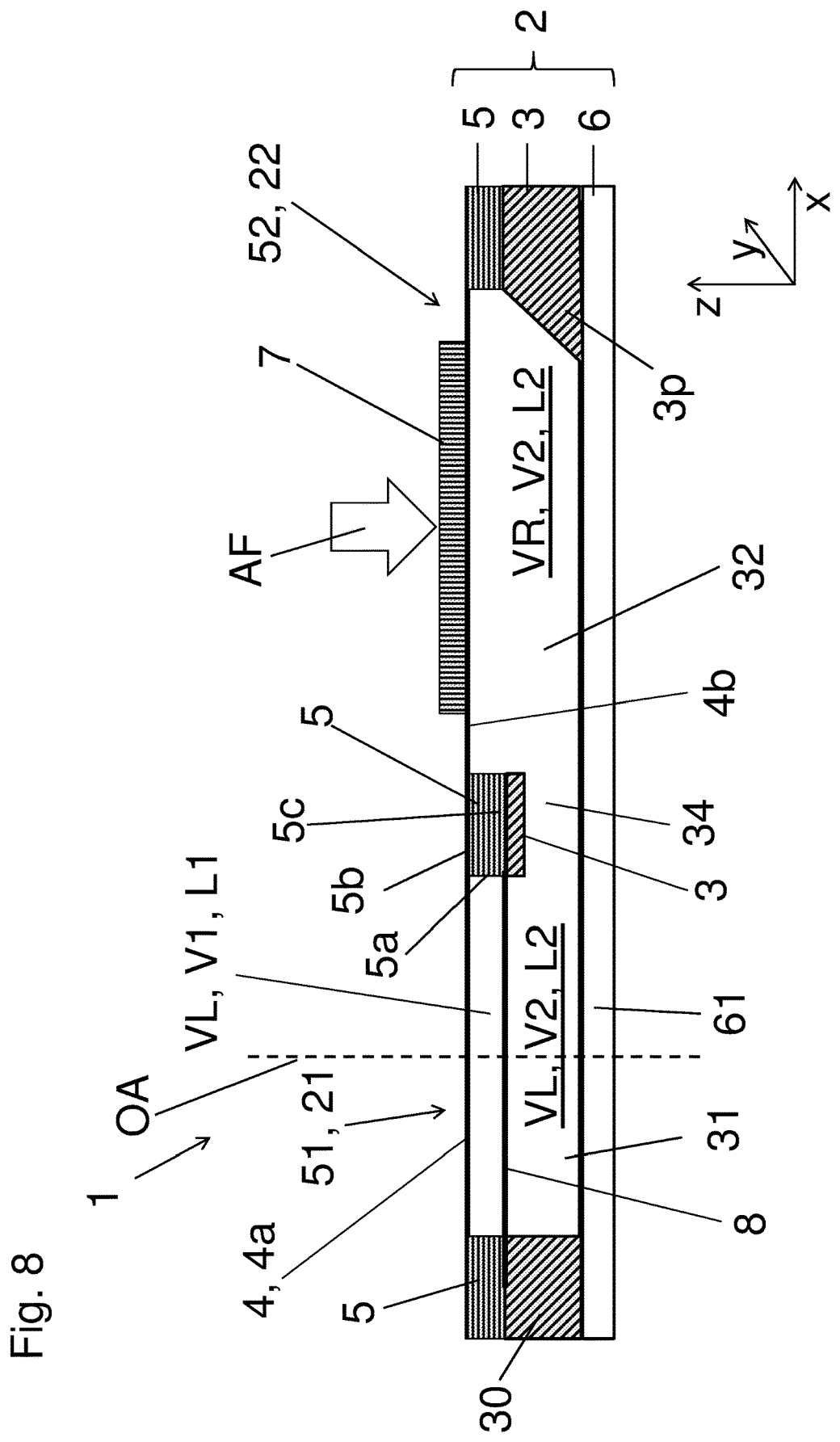
FIG. 8 shows a cross section of a seventh embodiment of the invention with a first volume formed by the lens shaping element.

FIG. 8 shows another example of the lens 1 according to the invention, Here, the first membrane 4 is connected to an outer portion or outer face 5b of the aperture 5a of the lens shaping element 5, wherein said outer portion 5b faces outwards the container 2, i.e. is arranged on an outside of the container 2, wherein the second membrane 8 is connected at an inner portion 5c of the aperture 5a of the lens shaping element 5, wherein said inner portion 5c faces in an opposite direction than the outer portion 5b. The aperture 5a of the lens shaping element 5 therefore forms a first through-hole 51 with wall members extending circumferentially around the first opening 21 of the container 2.

Between the lens area 4a of the first membrane 4 and the second membrane 8 the first liquid L1 is comprised in the first volume V1. More precisely, the lens area 4a of the first membrane 4 faces with a first side the outside of the container 2, wherein with a second side the lens area 4a of the first membrane 4 faces the first liquid L1 in the first volume V1 and the second membrane 8 faces with a first side the first liquid L1 in the first volume V1 and with a second side the second liquid L2 in the second volume V2. The second volume V2 extends from the lens volume VL into the reservoir volume VR, wherein the first volume V1 is completely contained in the lens volume VL.

Both membranes 4, 8 cover the first opening 21 essentially planar such that in the equilibrium state of the lens 1, the lens 1 does not exhibit an optical power. The thickness of lens shaping element 5 at the aperture 5a and the area comprised by the aperture 5a defines the size of the first volume V1.

The membrane portion 4b at the second opening 22 in the second through-hole 52 of the lens shaping element 5 is comprised by the first membrane 4.

Figure 9:
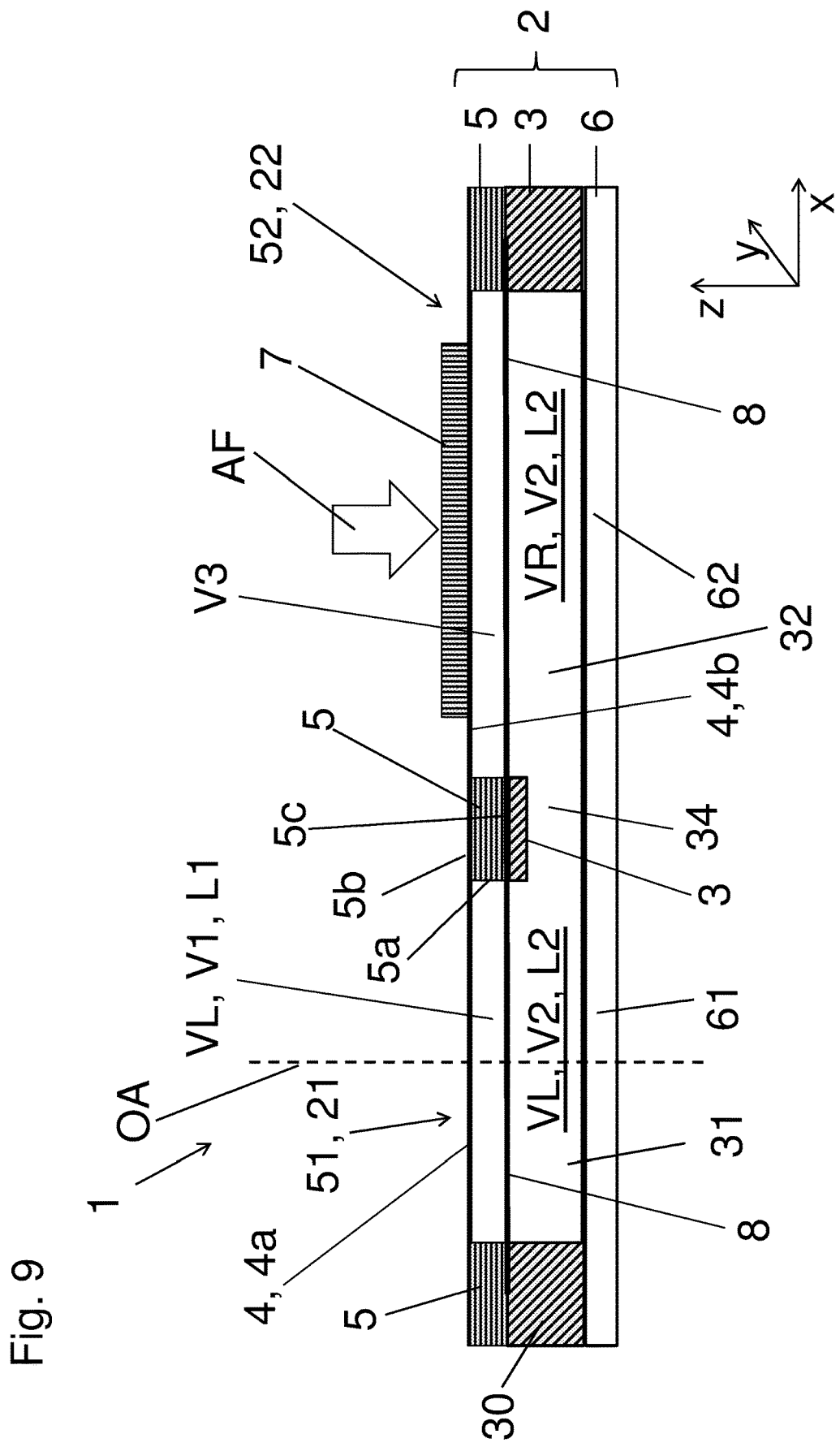
FIG. 9 shows a cross section of an eights embodiment of the invention having two membranes covering the second opening of the container.

In FIG. 9 shows a variation of the embodiment displayed in FIG. 8. Here, in addition to the first membrane 4, the second membrane 8 covers the second opening of the container 2 as well. The lens shaping element 5 by means of its second through hole 52 forms a third volume V3 that is arranged between the second membrane 8 and the first membrane 4b. The third volume V3 can be filled with virtually any fluid or liquid, for example with the first liquid.

Figure 10:
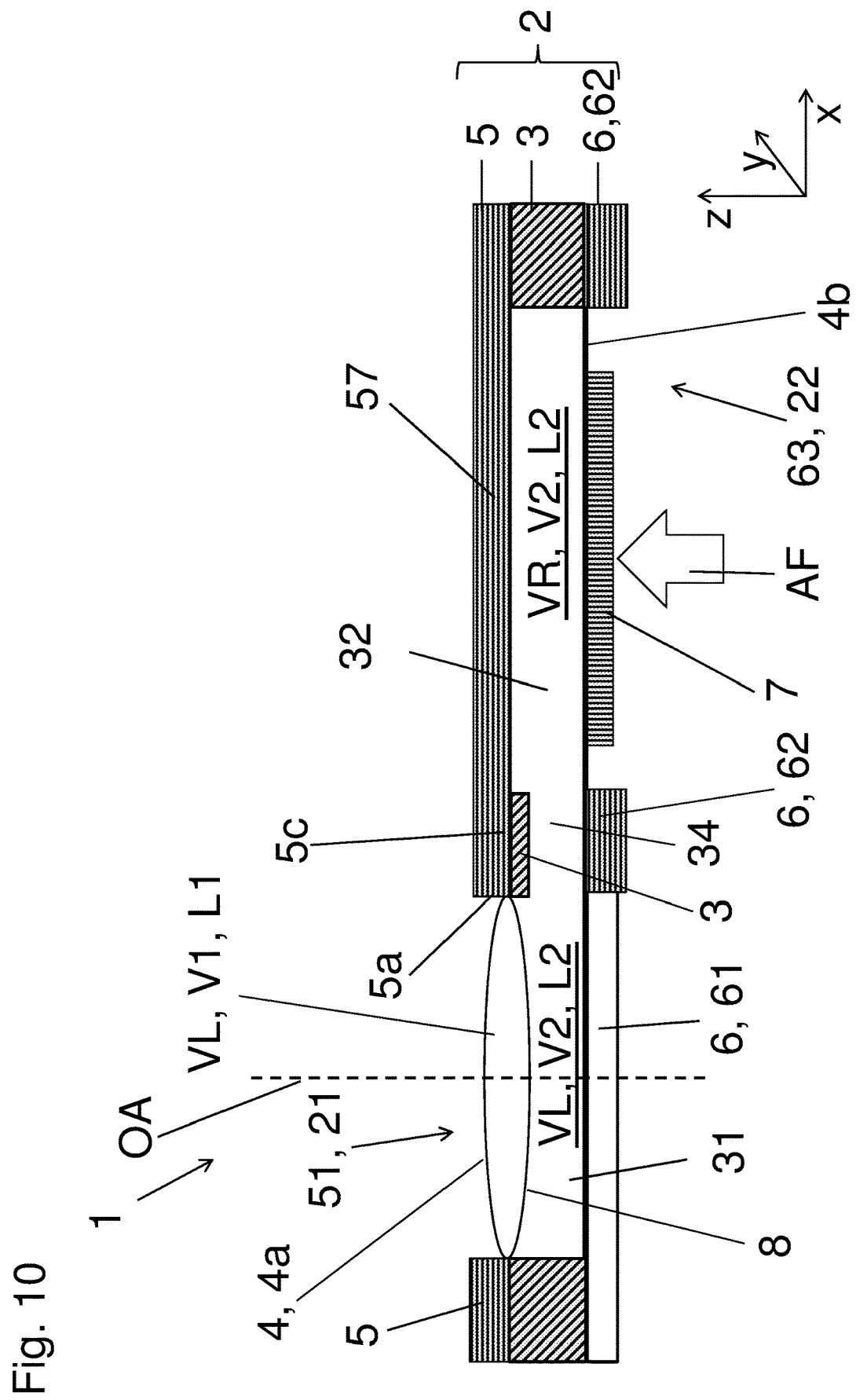
FIG. 10 shows a cross section of a ninth embodiment of the invention with the actuation on an opposite site of the aperture of the lens shaping element.

In FIG. 10 a similar embodiment as in FIG. 6 is shown. However, here the membrane portion 4b and the second opening 22 of the container 2 are arranged on an opposite side than the first opening 21 of the container 2 and the first through-opening 51 of the lens shaping element 5. The bottom structure 6, comprises a through-hole 63 to the second recess 32 formed by the frame structure opening 63. In turn the lens shaping element comprises a portion 57 opposite the second opening 22 that is continuous and closed.

Therefore, the actuation and any actuation assembly can be arranged on the other side of the container 2 allowing flexibility for potential geometric constraints of the building space into which the lens 2 is to be integrated. It is noted that this embodiment can be applied to the other embodiments of the invention as well in an analogous way.

Figure 11:
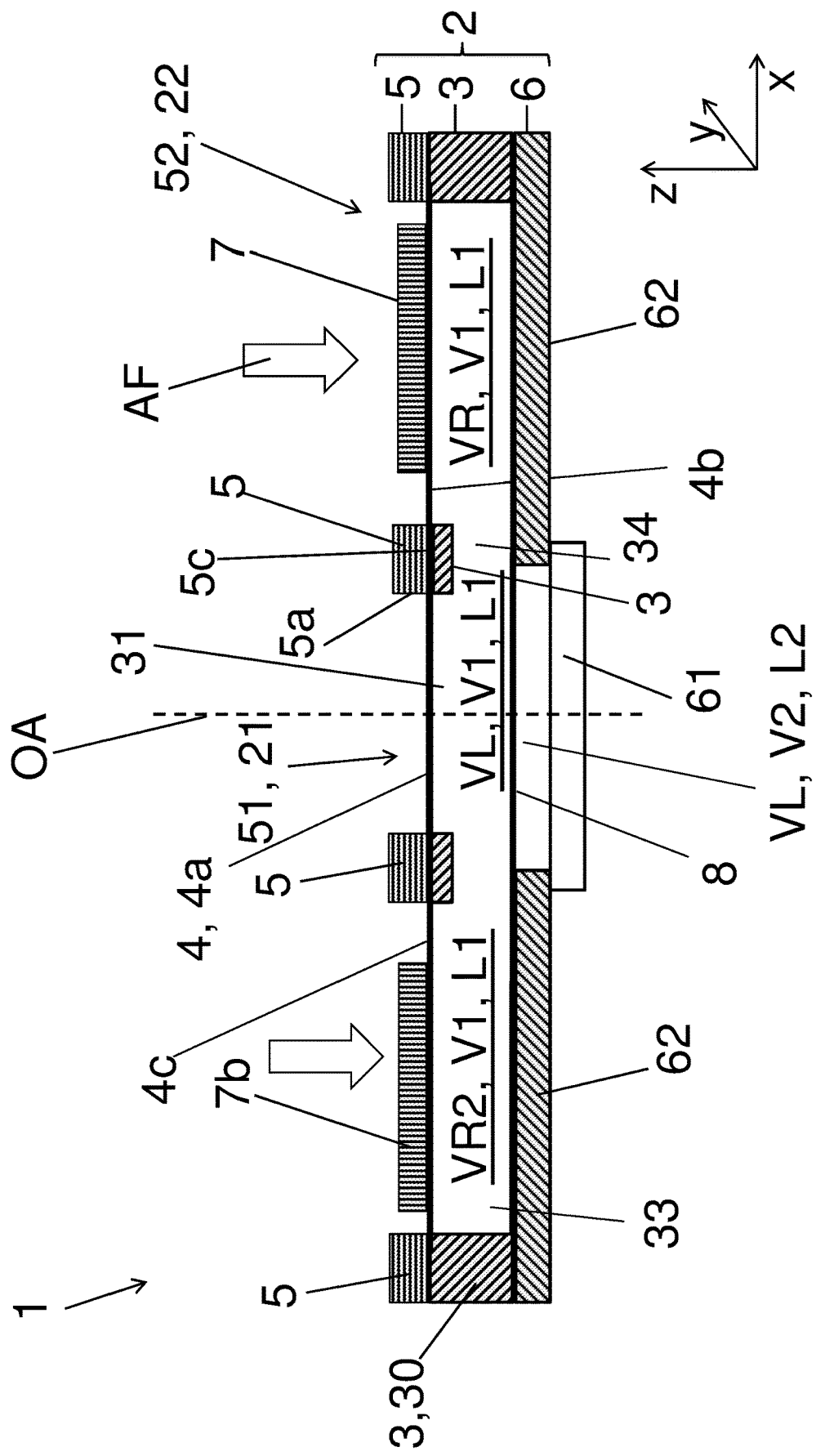
FIG. 11 shows a cross section of a fifth embodiment of the invention with two reservoir volume and two actuation structures.

In FIG. 11 an embodiment is shown that allows for the integration of two piston structures 7, 7b and thus potentially for two actuation devices (not shown).

For this purpose the container comprises a third opening 53 giving access to a recess 33 of the frame structure 3 laterally extending the reservoir volume to a further reservoir volume VR2 of the lens 1 that is fluidically connected to the lens volume VL.

The third recess 33 is covered and sealed by a further membrane portion 4c that is integrally formed with the first membrane 4 according to this embodiment, but can be formed also by an independent membrane.

On the further membrane portion 4c the further piston structure 7b is arranged on an outside of the container 2. The lens 1 of FIG. 11 is symmetric with respect to the z-y plane. The first volume V1 is therefore also comprised in the third recess 33 of the frame structure 3. The lens shaping element has a third through opening 53 for comprising the further membrane portion 4c.

Figure 12:
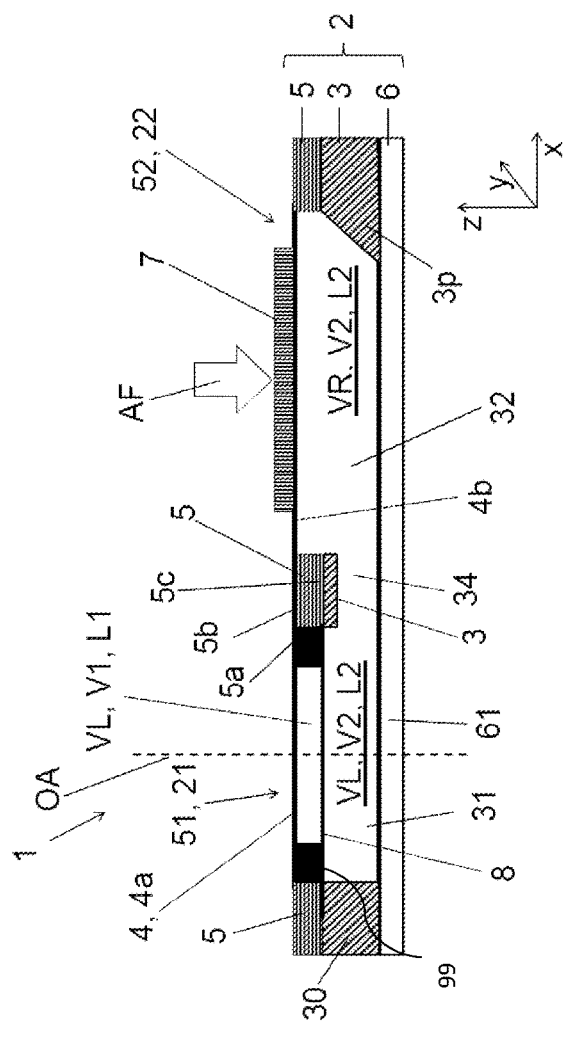
FIG. 12 shows an exemplary embodiment of a lens in a sectional view.

FIG. 12 shows an exemplary embodiment of the tunable liquid lens 1 in a sectional view. The lens 1 with an adjustable optical power comprises a container 2 with a frame structure 3, wherein the frame structure 3 delimits a lens volume VL and a reservoir volume VR at least partially in a lateral direction, wherein the lens volume VL and the reservoir volume VR are fluidically connected. A first opening 21 extends through the frame structure 3, wherein the lens volume VL is arranged at least partially in the first opening 21. A bottom structure 6 and an elastically deformable transparent first membrane 4 delimit the lens volume VL on opposite sides of the first opening 21.

A second opening extends through the frame structure 3, wherein the reservoir volume VR is arranged at least partially in the second opening. A further membrane portion 4b delimits the reservoir volume VR on one side of the second opening 22.

The transparent second membrane 8 separates a first volume V1 filled with the first liquid L1 from the second volume V2 filled with the second liquid L2. The first volume V1 and the second volume V1 are arranged in the lens volume VL, and a spacer 99 is arranged between the second membrane 8 and the first membrane 4. The spacer 99 has a ring shape and is directly connected to the first 4 and the second 8 membrane, wherein the spacer 99 circumvents the lens area 4a of the first membrane 4. The spacer 99 comprises or consists of silicon, in particular monocrystalline silicon.

Figure 13:
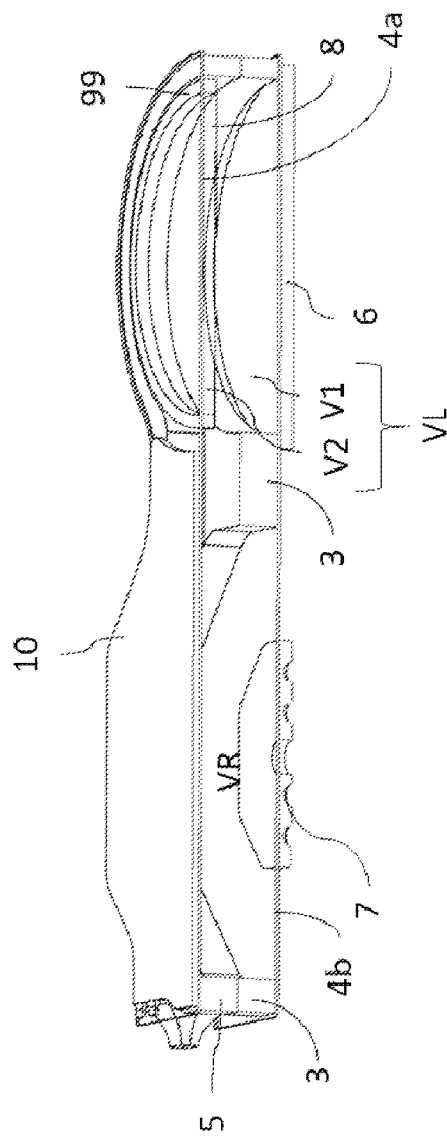
FIG. 13 shows an exemplary embodiment of a lens in a sectioned perspective view.

FIG. 13 shows an exemplary embodiment of the tunable liquid lens 1 in a sectional perspective view. The lens comprises a reservoir volume VR and a lens volume VL which are connected. The lens volume VL comprises the first volume V1 with a first liquid L1 and the second volume V2 with a second liquid L2. A second membrane 8 separates the first V1 and the second volume V2. During actuation, the first liquid L1 is moved between the reservoir volume and the lens volume.

The lens is actuated by moving the piston 7. The further portion 4b is flexible, whereby the piston 7 may be displaced in a direction along the optical axis. Displacement of the piston with respect to the frame structure 3 alters the reservoir volume VR. Altering the reservoir volume VR results in a change of the first volume, whereby the first membrane 4 and the second membrane 8 are displaced. The displacement of the first 4 and the second 8 membrane causes a change of the curvature of the first 4 and second 8 membrane, which alters the optical power of the lens 1.

The bottom structure 6 is arranged on an opposite side of the first opening 21 with respect to the membrane portion 4a. The bottom structure 6 is at least partially transparent and rigid. Thus, a deflection of the bottom structure 6 caused by deflecting the piston 7 is neglectable and does not change the optical properties of surfaces of the bottom structure 6.

The lens comprises a cover element 10, which is arranged on an opposite side of the further membrane portion 4b with respect to the second opening 22. The cover element 10 may be opaque. In particular, cover element 10 is rigid, such that any deformation of the cover element caused by deflection of the piston 7 is neglectable.

In particular, the membrane comprising the further membrane portion 4b extends over the first and the second opening. Hence, the said membrane is adjacent to the reservoir volume VR and the lens volume VL. The first membrane 4 comprising the portion of the membrane 4a extends over the first opening 21 and the second opening 22. In particular, the membranes 4 comprising the membrane portion 4a and the further membrane portion 4b both delimit the reservoir volume and the lens volume. In the region of the first opening 21, the bottom structure 6 prevents deflection of the membrane comprising the further membrane portion 4b. In the region of the second opening 22 the cover element 10 prevents deflection of the first membrane 4.

LIST OF REFERENCE SIGNS

1 lens
2 container
3 frame structure
4 first membrane
4a lens area of the first membrane
4b membrane portion
4c further membrane portion
5 lens shaping element
5a aperture of the lens shaping element
5b outer face of the lens shaping element
5c inner face of the lens shaping element
6 bottom structure
7 piston structure
7b further piston structure
8 second membrane
9 intermediate layer structure
10 cover element
21 first opening of container
22 second opening of container
30 lateral wall portion
31 first recess
32 second recess
33 third recess
34 channel
34a channel tuning element
51 first through-hole of lens shaping element
52 second through-hole of lens shaping element
57 lens shaping element portion opposite the second opening of the container
61 transparent portion of the bottom structure
62 non-transparent portion of the bottom structure
70 hole of piston structure
99 spacer
OA optical axis
AF actuation force
d1 first mass density
d2 second mass density
x,y,z Cartesian directions
V1 first volume
V2 second volume
VR reservoir volume
VR2 further reservoir volume
VL lens volume
L1 first liquid
L2 second liquid

We claim:

1. A lens having an adjustable optical power comprising a container with
   a frame structure, wherein the frame structure delimits a lens volume and a reservoir volume at least partially in a lateral direction, wherein the lens volume and the reservoir volume are fluidically connected,
   a first opening extending through the frame structure, wherein
   the lens volume is arranged at least partially in the first opening,
   a bottom structure and an elastically deformable transparent first membrane delimit the lens volume on opposite sides of the first opening,
   a second opening extending through the frame structure, wherein
   the reservoir volume is arranged at least partially in the second opening,
   a further membrane portion delimits the reservoir volume on one side of the second opening,
   a transparent second membrane separating a first volume filled with a first liquid from a second volume filled with a second liquid,
   the first volume and the second volume are arranged in the lens volume, and
   a spacer is arranged between the second membrane and the first membrane,
   wherein the lens comprises a piston structure arranged on a side of the further membrane portion covering the second opening, wherein the piston structure is movable towards or away from the second opening such as to pump the first or the second liquid from the reservoir volume to the lens volume or vice versa.

2. Lens according to claim 1, wherein the spacer has a ring shape and is directly connected to the first and the second membrane, wherein the spacer circumvents a lens area of the first membrane.

3. Lens according to claim 1, wherein the spacer comprises or consists of silicon.

4. Lens according to claim 1, wherein the second opening does not have the shape of a prism.

5. Lens according to claim 1, wherein the second opening is delimited on one side by a further membrane portion, and a cross-sectional area of the second opening decreases with increasing distance from the further membrane portion.

6. Lens according to claim 1, wherein either the first volume or the second volume extends also into the reservoir volume, such that the reservoir volume comprises the first liquid or the second liquid.

7. Lens according to claim 1, wherein the membrane portion is comprised, particularly integrally comprised by the first membrane, wherein the first membrane covers the first and the second opening or wherein the membrane portion is comprised, particularly integrally comprised by the second membrane, wherein the second membrane (8) covers the first and the second opening.

8. Lens according to claim 1, wherein the first liquid has a first refractive index and a first mass density, and the second liquid has a second refractive index and a second mass density, wherein the refractive indices and the mass densities are different respectively, and the refractive indices and the mass densities are selected such that an acceleration induced aberration of the lens, in particular gravity coma is compensated or prevented.

9. Lens according to claim 1, wherein the container comprises a lens shaping element,
   the first opening extends through the lens shaping element,
   the lens shaping element (5) circumvents the membrane portion and the second membrane, the lens shaping element comprises an outer portion facing away from the frame structure and an inner portion facing towards the frame structure, wherein the membrane portion is connected to the outer portion and the second membrane is connected to the inner portion.

10. Lens according to claim 1, wherein the further membrane portion is elastically deformable such as to pump the first liquid or the second liquid from the reservoir volume into the lens volume to change a curvature of the lens area of the first membrane and therewith an optical power of the lens, and/or wherein the further membrane portion is configured to be deformed to pump the first liquid or the second liquid from the lens volume into the reservoir volume to change a curvature of the lens area of the first membrane and therewith an optical power of the lens.

11. Lens according to claim 1, wherein the piston structure is arranged on an outward facing side of the further membrane portion covering the second opening, wherein the piston structure is operable by an actuator that is configured to exert a mechanical actuation force for pushing or pulling the piston structure towards or away from the second opening such as to pump the first or the second liquid from the reservoir volume to the lens volume or vice versa.

* * * * *